Figure 1:
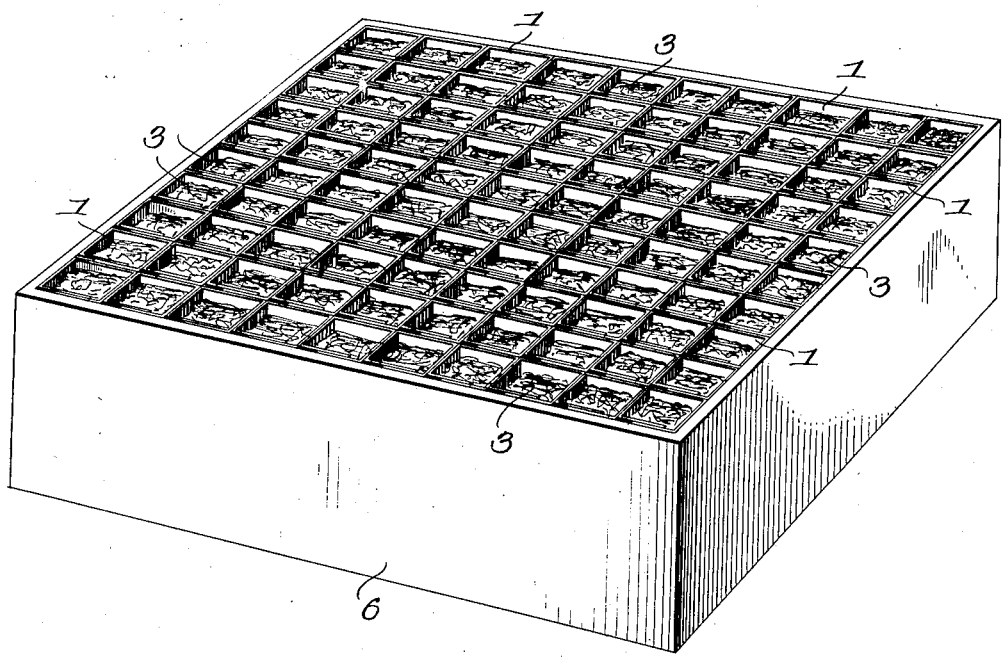

No. 837,977. PATENTED DEC. 11, 1906.
R. S. THORNTON.
TRANSPLANTER.
APPLICATION FILED MAY 22, 1905.

2 SHEETS—SHEET 1.

Witnesses:

Ross S. Thornton, Inventor,
by C. A. Snow & Co.
Attorneys.

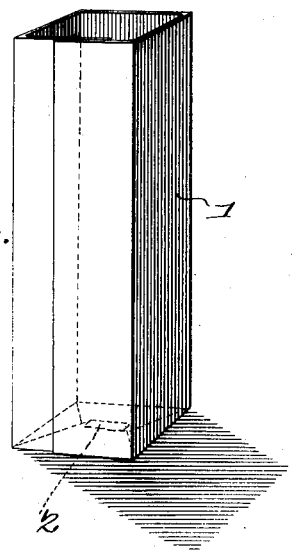
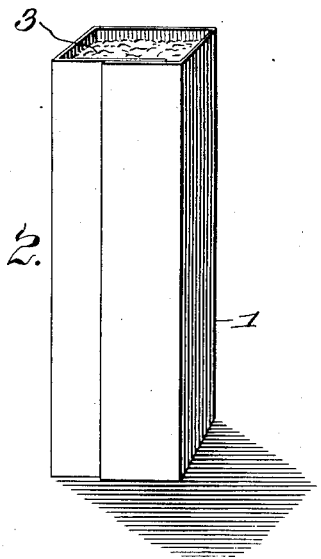
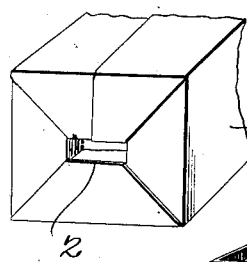
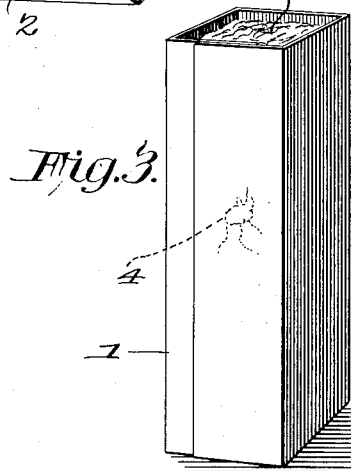
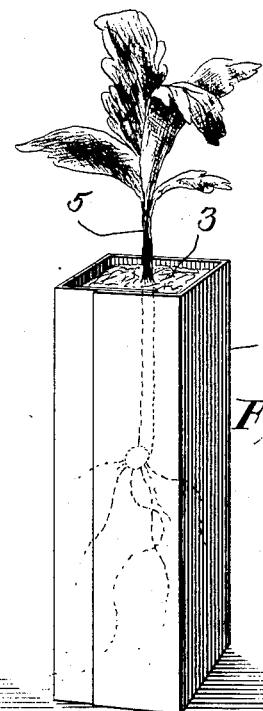

UNITED STATES PATENT OFFICE.

ROSS S. THORNTON, OF LEXINGTON, NEBRASKA.

TRANSPLANTER.

No. 837,977.	Specification of Letters Patent.	Patented Dec. 11, 1906.

Application filed May 22, 1905. Serial No. 261,656.

*To all whom it may concern:*

Be it known that I, ROSS S. THORNTON, a citizen of the United States, residing at Lexington, in the county of Dawson and State of Nebraska, have invented a new and useful Transplanter, of which the following is a specification.

This invention relates to a method of germinating and transplanting plants.

The object of the invention is to provide simple and novel means whereby a large number of seeds can be expeditiously planted within a tray and will be held during the germination and for a desired period after sprouting without danger of the roots of the various plants becoming tangled.

A still further object is to so dispose the seeds within the tray that the plants can be quickly removed therefrom and transplanted without danger of the injury which ordinarily results from the untangling and consequent breakage of the roots.

The invention consists of a tray of desired proportions, which is filled with a large number of solid-walled water-absorbent holders disposed in close contact with each other and with the inner walls of the receptacle, said holders subdividing the tray into independent cells. Dirt is then spread over the tray so as to fill the cells nearly to the top at one operation, the upper ends of the cells indicating the positions thereof. A seed is then deposited in each cell and the dirt is maintained in a moist condition until they have sprouted, after which the dirt is removed in separate packages with the sprouts therein and deposited in the earth.

The invention also consists of certain other novel features of construction and combinations of parts, which will be hereinafter more fully described, and pointed out in the claim.

In the accompanying drawings is shown the apparatus employed in carrying out the process.

In said drawings, Figure 1 is a perspective view of a tray subdivided into cells by means of a plurality of receptacles, said receptacles being shown nearly filled and ready to receive seeds. Fig. 2 is a detail view of one of the receptacles removed from the tray. Fig. 3 is a similar view showing by dotted lines the position of a seed therein; and Fig. 4 is a view showing by dotted lines the position of the seed and its roots after sprouting, the walls of the receptacle serving to retain the roots within the dirt contained within the receptacle. Fig. 5 is a perspective view of the bottom of one of the receptacles; and Fig. 6 is another perspective view of the receptacle, showing by dotted lines the positions of the folds thereof.

Referring to the figures by characters of reference, 6 is a tray of any desired proportions, adapted to be subdivided into a plurality of similar cells by means of receptacles 1, which fit closely together and are preferably oblong in outline. Each of these receptacles is formed of a sheet of paper or other material which will absorb moisture and is produced by folding the paper so that its edges will overlap to form a rectangular tube, after which one end of the tube is folded inward to produce a small rectangular opening 2, through which any moisture contained within the receptacle may drain. It is well known that heretofore in planting seeds for germinating purposes considerable time and care have been necessary after the seeds have sprouted to properly untangle the roots of the various plants, this operation necessitating the exposure of the roots and oftentimes resulting in the destruction of the plants. By providing the apparatus herein described these objections are overcome. The receptacles 1 are placed within the tray so that no vacant places will occur between them. After the boxes and receptacles have been positioned in this manner the entire tray is filled with dirt 3 at one operation, and the dirt will of course settle into the separate cells formed by the boxes, filling them nearly to the top, so that the upper ends of the receptacles or boxes will be exposed to indicate to the user their exact locations. In each of these boxes a seed 4 is planted, and the entire contents of the tray 6 are kept moist and the seeds grown as though the tray were not divided into separate cells. When the plants 5 have properly sprouted, each is removed with its separate package of dirt without interfering with the roots of the adjoining plants. Said packages, together with the boxes inclosing them, may then be planted in the ground and the boxes will ultimately rot and the roots work therethrough, so that it becomes unnecessary at any time after the planting of the seed to interfere with the dirt around the roots.

What is claimed is—

The herein-described method of germinating and transplanting which consists in placing a plurality of empty, solid-walled water-absorbent holders in a receptacle in close contact with each other and with the inner walls of the receptacle, said holders subdividing the tray into independent cells; second, spreading dirt over the tray so as to fill the cells nearly to the top at one operation, the upper ends of the cells indicating the positions thereof; third, depositing a seed in each cell; fourth, maintaining the dirt in a moist condition until the seeds have sprouted; and, fifth, separately removing the packages of dirt with the sprouts therein and depositing them in the earth.

In testimony that I claim the foregoing as my own I have hereto affixed my signature in the presence of two witnesses.

ROSS S. THORNTON.

Witnesses:
S. T. KRIER,
S. C. MULLIN.